US012167113B1

(12) United States Patent
Anderson

(10) Patent No.: US 12,167,113 B1
(45) Date of Patent: Dec. 10, 2024

(54) ENCLOSURE FOR A VIDEO CAMERA AND LIGHT

(71) Applicant: Louis Charles Anderson, Bel Air, MD (US)

(72) Inventor: Louis Charles Anderson, Bel Air, MD (US)

( * ) Notice: Subject to any disclaimer, the term of this patent is extended or adjusted under 35 U.S.C. 154(b) by 0 days.

(21) Appl. No.: 18/639,925

(22) Filed: Apr. 18, 2024

(51) Int. Cl.
*H04N 23/51* (2023.01)
*G03B 17/08* (2021.01)
*H01H 36/00* (2006.01)
*H04N 23/56* (2023.01)

(52) U.S. Cl.
CPC ............ *H04N 23/51* (2023.01); *G03B 17/08* (2013.01); *H01H 36/0033* (2013.01); *H01H 36/0066* (2013.01); *H04N 23/56* (2023.01)

(58) Field of Classification Search
CPC ........ H04N 23/51; H04N 23/56; G03B 17/08; H01H 36/0033; H01H 36/0066
See application file for complete search history.

(56) References Cited

U.S. PATENT DOCUMENTS

| 11,509,867 | B2* | 11/2022 | Baki | H04N 23/56 |
| 2019/0172189 | A1* | 6/2019 | Pop | G06V 10/147 |
| 2019/0230324 | A1* | 7/2019 | Chien | F21K 9/232 |
| 2019/0246074 | A1* | 8/2019 | Sebree | H04N 23/51 |
| 2021/0112184 | A1* | 4/2021 | Jarvis | H04N 23/51 |
| 2021/0314531 | A1* | 10/2021 | Jo | G06V 20/52 |
| 2023/0043545 | A1* | 2/2023 | Chien | F21S 4/28 |

* cited by examiner

*Primary Examiner* — Amy R Hsu
(74) *Attorney, Agent, or Firm* — Leavitt Eldredge Law Firm; Richard Eldredge

(57) ABSTRACT

An enclosure for a video camera and light, the enclosure including a housing; an internal body secured within the housing; one or more connections extending from the housing; an end plate secured to the housing, a first window extending through the end plate; and a second window extending through the end plate; an end cap secured to a second end of the housing and to seal the internal body within the housing; a video recorder positioned within the internal body and positioned such that a field of view extends out of the first window; a light positioned within the internal body, the light being independent of the video recorder and positioned such that a beam of light extends out of the second window and parallel with the field of view; a magnet holder extending from the housing; and a magnet within the magnet holder and engaged magnetically with a switch associated with the light; dislodging the magnet from the magnet holder causes the switch to activate the light.

9 Claims, 7 Drawing Sheets

ENCLOSURE FOR A VIDEO CAMERA AND LIGHT

BACKGROUND

1. Field of the Invention

The present invention relates generally to video and light systems, and more specifically to an enclosure for a video and light that provides for use in water and provides for electrical separation of the camera and the light, thereby ensuring optimal functionality.

2. Description of Related Art

Camera and light systems are well known in the art and are effective means to capture moments and events. It is a common practice for use of these devices during hunting and fishing to capture events, wherein a user will activate a camera and/or light as necessary to capture a moment. For example, a user may activate a camera/video recorder during hunting to capture a moment that the hunter takes a shot.

One of the problems commonly associated with conventional systems is limited use. For example, a user may desire to use a camera or video underwater for fishing, which requires waterproof features. Further, the user may desire to use a camera/video recorder at the same time as a light.

Accordingly, although great strides have been made in the area of camera and light systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
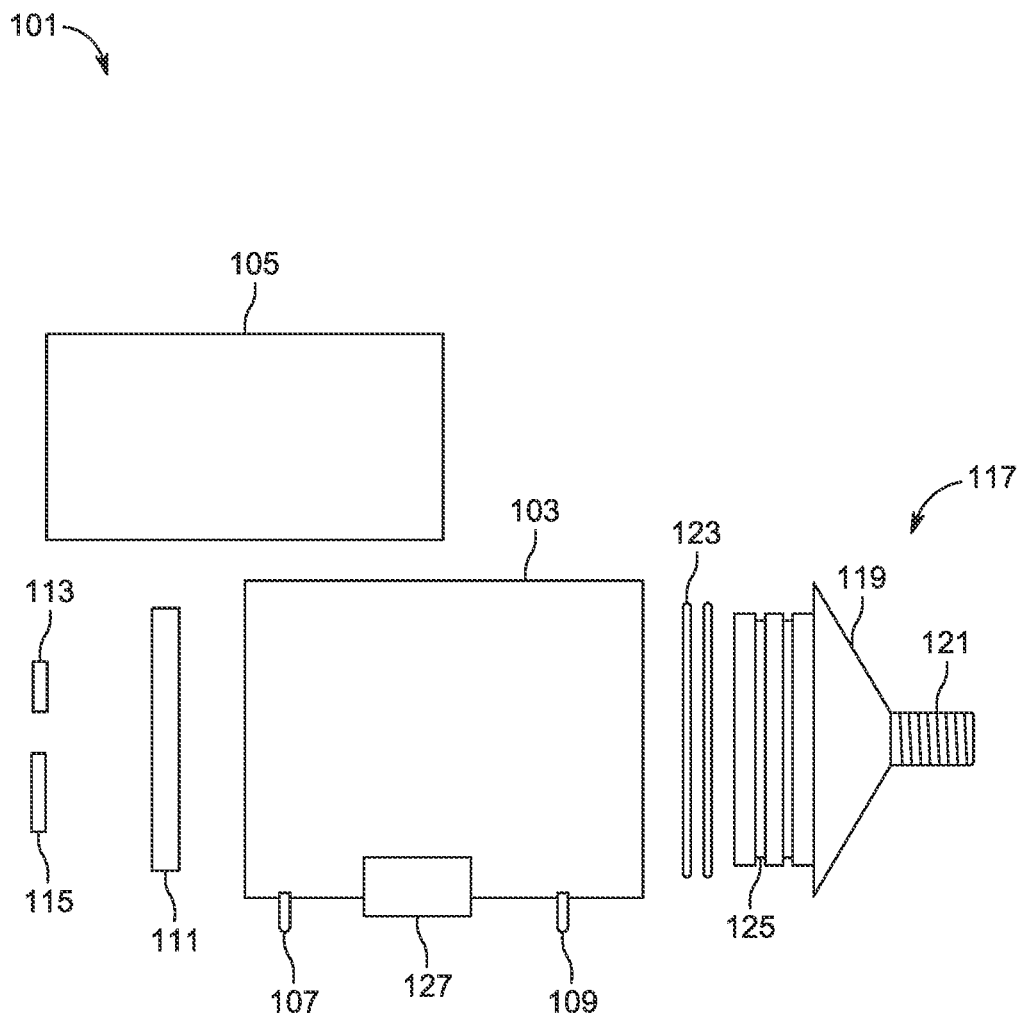
FIG. 1 is a disassembled side view of an enclosure for a video camera and light in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional camera and light systems. Specifically, the present invention provides for a watertight enclosure that is adaptable for use in hunting and fishing. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
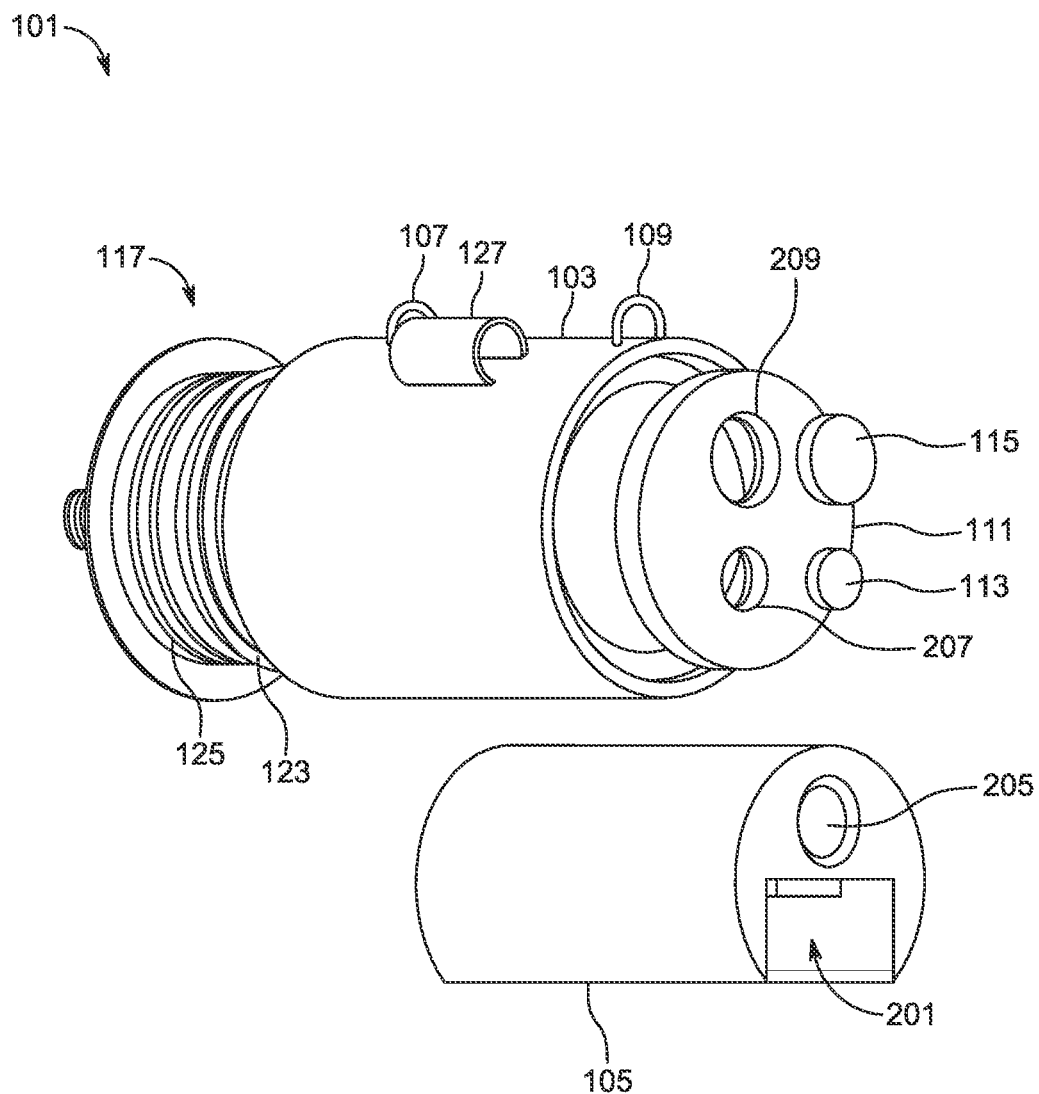
FIG. 2 is partially assembled perspective view of the enclosure of FIG. 1.
Figure 6:
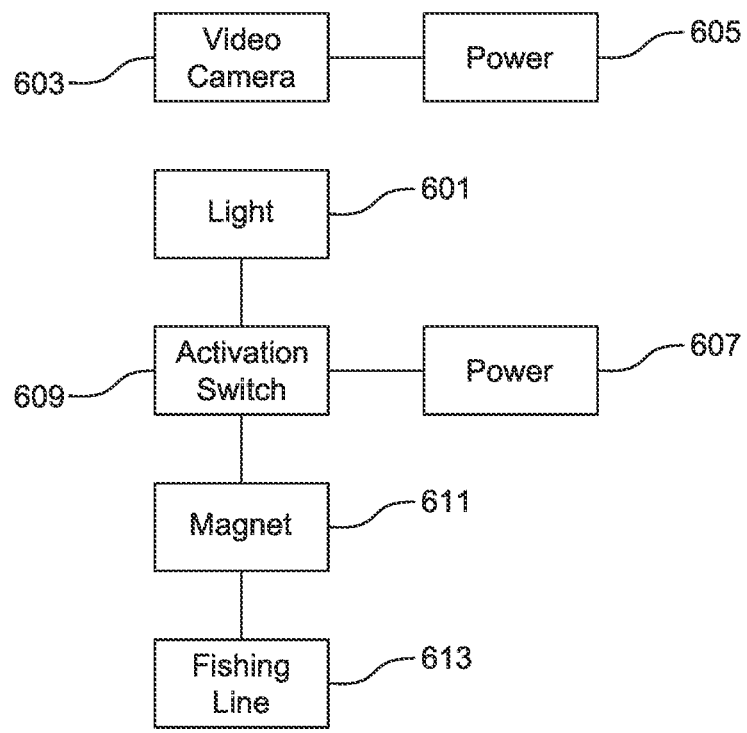
FIG. 6 is a schematic depicting the electrical components of a camera and light system utilizing the enclosure of FIG. 1 in accordance with the present invention.

Referring now to the drawings wherein like reference characters identify corresponding or similar elements throughout the several views, FIGS. 1 and 2 depict an enclosure 101 in accordance with a preferred embodiment of the present application. The enclosure 101 provides for use with a light and video camera, as shown in FIG. 6.

The enclosure 101 includes a housing 103 and an internal body 105 secured within the housing. The components, including the housing and internal body, may be composed of a suitable material, such as plastics or metals. As shown, one or more connections 107, 109 extending from the housing and provide for locations to secure a line 501, 503 or other structure, such as a bow, or any structure that the user desires.

It should be appreciated and understood that the internal body 105 is where a camera and light are held and wherein power sources for each are also held in a manner that keeps them separated. The internal body 105 will hold the video camera and the light such that they are in a parallel configuration, meaning that the center of the conical light beam and the camera/video recorder field of view are parallel (see FIG. 5). The internal body 105 will be secured within the housing such that there is little to no movement of the internal body therein.

Figure 3:
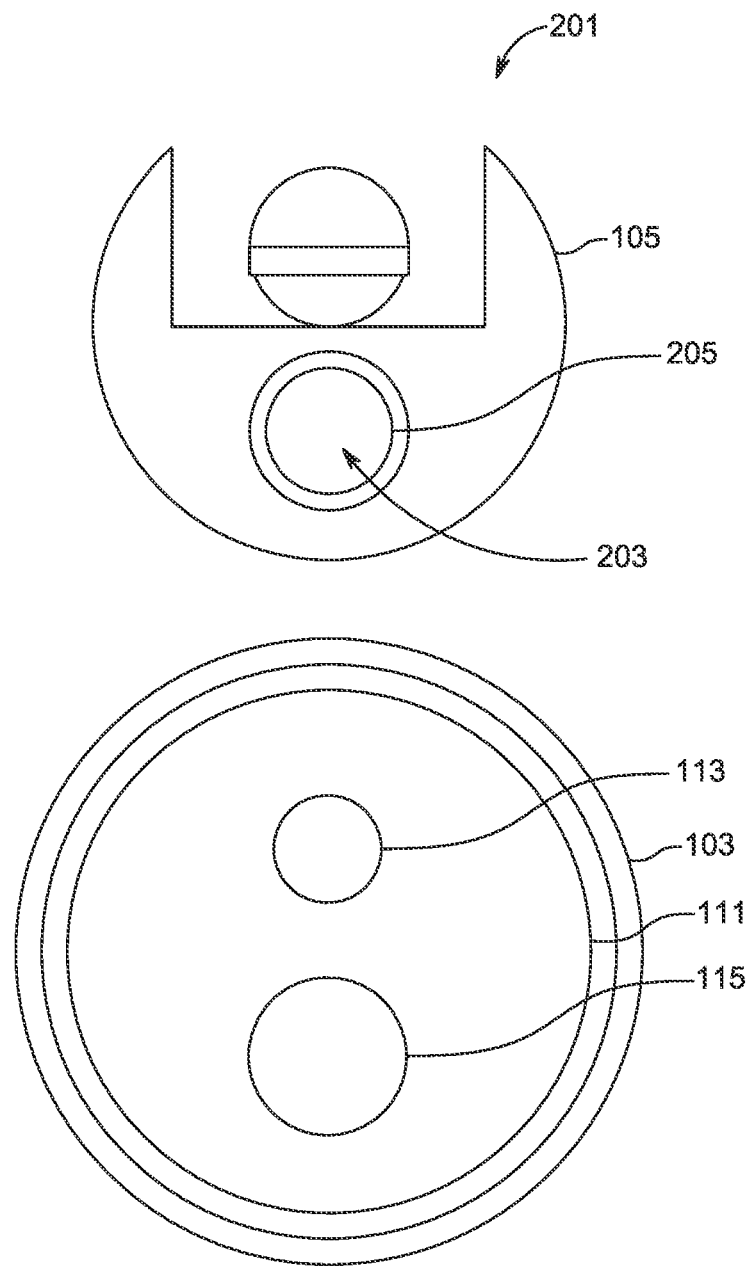
FIG. 3 is an end view of the enclosure of FIG. 1.

As best shown in FIGS. 2 and 3, the internal body 105 can include a first opening 201 through which the video recorder views and a second opening 203 which includes a tube 205 that ensures that scattered light from inside of the enclosure does not extend to the viewpoint of the camera. Instead, the tube 205 directs the light out of the internal body and the housing. This means that auto exposure decision of the camera/video recorder are optimized by responding only to the light from outside of the housing.

The enclosure 101 further includes an end plate 111 secured to a first end of the housing, the end plate having a first window 113 extending through the end plate via a first cavity 207 and into the housing, and a second window 115 extending through the end plate via a second cavity 209 and into the housing. The windows 113, 115 in at least some embodiments are composed of clear plastic and sealed/glued within holes extending through the end plate. The sealing of the windows may be completed by any means known in the art, such as through incorporation of grooves, shelves, or the like. Similarly, the end plate 111 itself may be secured to the housing through a means known in the art, such as adhesives, shelves, grooves, O-rings or any other configuration that creates a watertight seal.

Further, an end cap 117 is secured to a second end of the housing and configured to seal the internal body within the housing. As shown, the end cap 117 includes a conically shaped end 119 and a threaded connection 121. The end cap 117 secures to the housing to create a watertight seal, using one or more O-rings 123 and O-ring ridges 125. The threaded connection 121 is used for attachment to bows, crow bows, rifles, and the like.

The enclosure 101 further includes a magnet holder 127 to hold a magnet to engage with a switch or activator for a light, as will be discussed herein.

In FIG. 3, an end view of the internal body 105 and the housing 103 are shown. As shown, the housing 103 includes the windows 113, 115.

Figure 4:
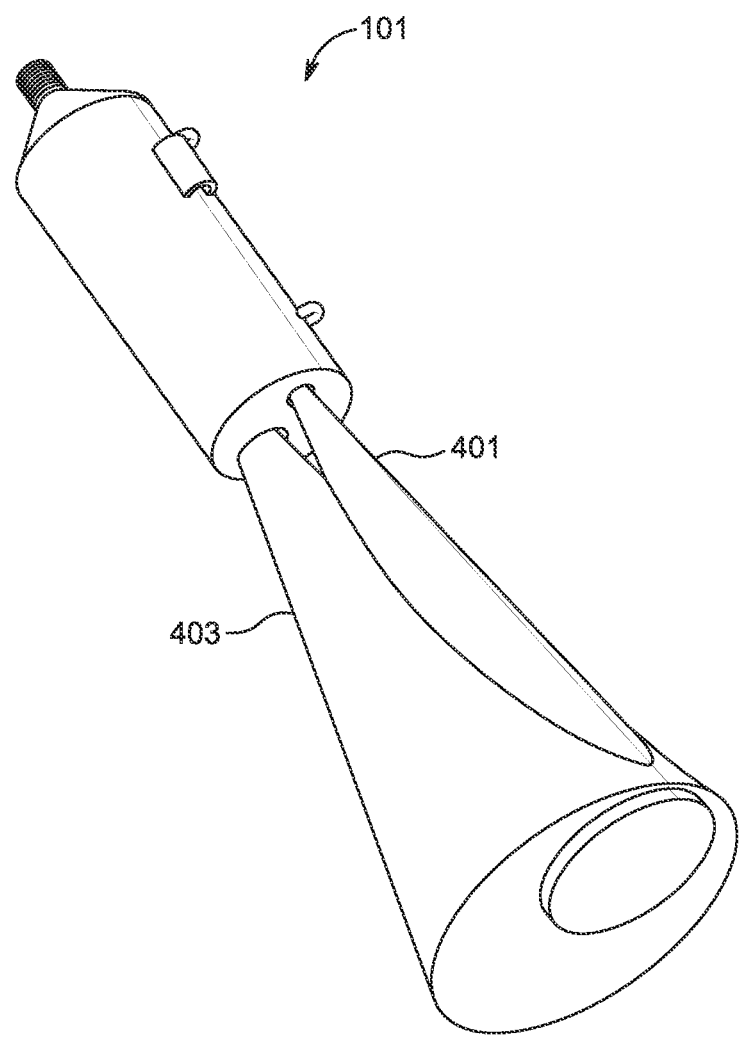
FIG. 4 is a perspective view showing a field of view of a video camera and a beam of light from a light in accordance with the present application.

In FIG. 4, the enclosure 101 is shown with a field of view 401 of a video camera and a beam of light 403 from a light in accordance with the present application. As shown, the two run parallel and extend in the same direction. This ensures that the light illuminates in the area necessary for the video capturing. It must be appreciated and understood that the light can vary, such as including filters, being infrared, high beam, or any other known in the art style of light. In addition, the camera may be a video camera, a still camera, or have other features that would readily be understood by those skilled in the art.

Figure 5:
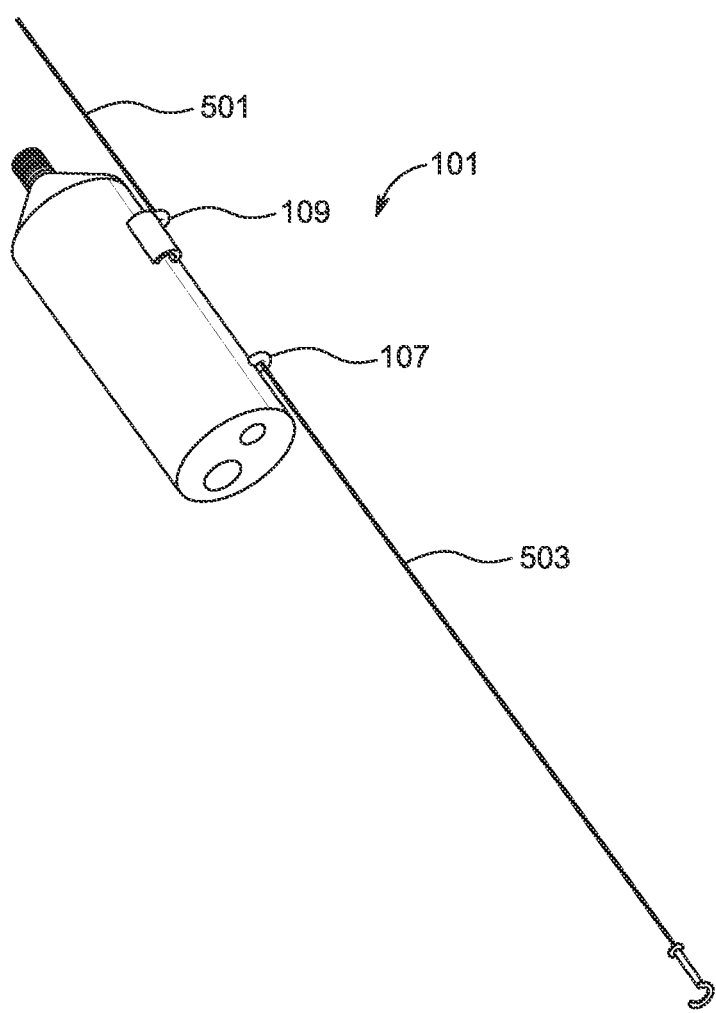
FIG. 5 is a perspective view showing the enclosure of FIG. 1 attached to a fishing line in accordance with the present invention.

In FIG. 5, the enclosure 101 is shown attached to line 501, 503 via the connections 109, 107. This allows for the enclosure to be secured in line with the fishing line, or other structure.

In FIG. 6, a schematic depicts the light 601 and video camera 603. As shown, each component has its own power source 605, 607 which ensures that if one fails, the other does not and further ensures that during activation of the light, the circuit to the video camera 603 will not be interrupted.

In at least one embodiment, a magnet 611 is secured within the magnet holder of the enclosure, wherein dislodging of the magnet 611 will cause activation of a switch 609 associated with the power 607 of the light, thereby activating the light 601. The magnet 611 may be dislodged such as when a fishing line is quickly moved or jolted, such as when a fish takes a lure. In this embodiment, the light will only go on after the fish bites or will be triggered when an animal is being shot.

Figure 7:
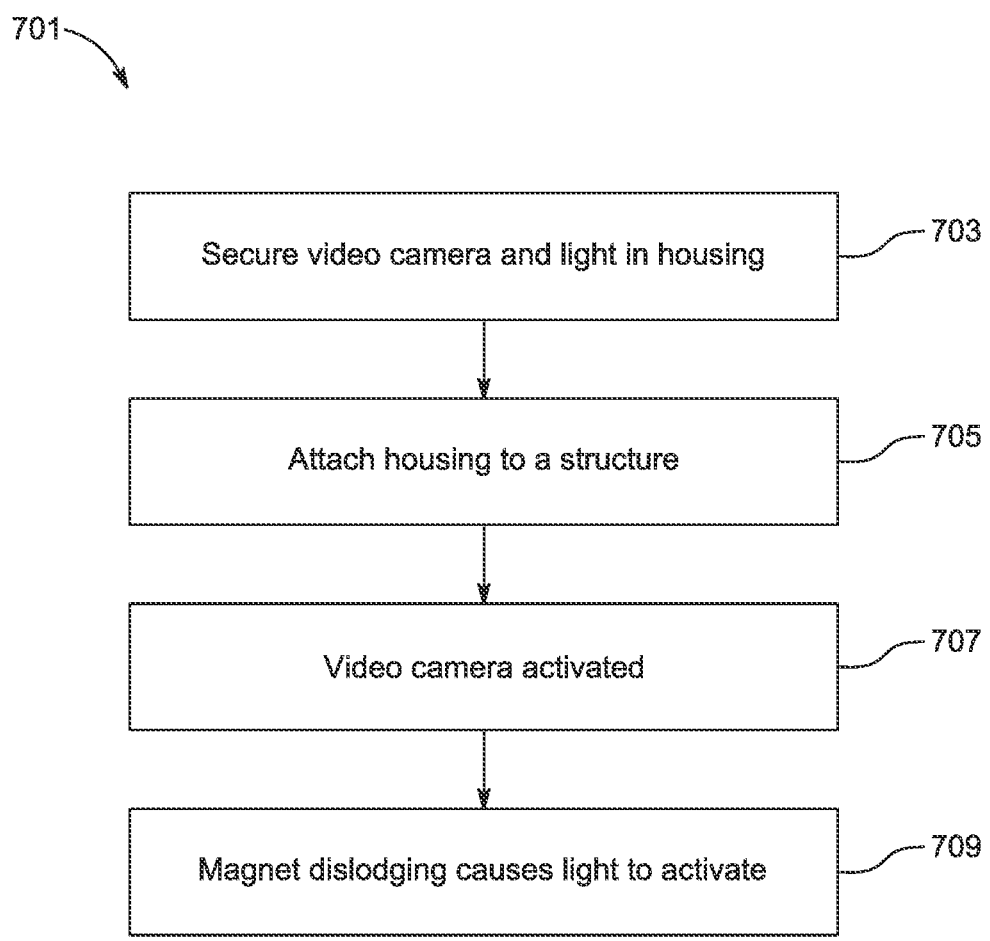
FIG. 7 is a flowchart of a method of use of the system of FIG. 6.

In FIG. 7, a flowchart 701 depicts a method of use associated with the present invention. During use, the video camera and the light will be secured within the housing, wherein they are protected from elements, such as water, as shown with box 703. The user will then attach the housing to a structure as desired, such as a fishing line, as shown with box 705. The user may then activate the video camera, as shown with box 707. Upon dislodging of the magnet, the light will then be activated, as shown with box 709.

It should be appreciated that one of the unique features believed characteristic of the present application is the configuration of the system that allows for the use of light and a camera that both shoot parallel and can be used underwater or when hunting. The system can be used with bows, crossbows, and guns while hunting. The threading on the cap allows for use with a stabilizer threaded hole on a bow or cross bow.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An enclosure for a video camera and light, the enclosure comprising:
   a housing;
   an internal body secured within the housing;
   one or more connections extending from the housing;
   an end plate secured to a first end of the housing, the end plate having:
   a first window extending through the end plate and into the housing; and
   a second window extending through the end plate and into the housing;
   an end cap secured to a second end of the housing and configured to seal the internal body within the housing;
   a video recorder positioned within the internal body and positioned such that a field of view extends out of the first window;
   a light positioned within the internal body, the light being independent of the video recorder and positioned such that a beam of light extends out of the second window and parallel with the field of view;
   a magnet holder extending from the housing; and
   a magnet within the magnet holder and engaged magnetically with a switch associated with the light;
   wherein dislodging the magnet from the magnet holder causes the switch to activate the light.

2. The enclosure of claim 1, further comprising:
   one or more O-rings positioned between the end cap and the housing to create a water tight seal.

3. The enclosure of claim 1, wherein the one or more connections provide for one or more locations to secure a line thereto, the line being, at least in part, from a fishing line.

4. The enclosure of claim 1, wherein the first window and the second window are composed of a clear plastic.

5. The enclosure of claim 1, wherein the light is a high intensity light.

6. The enclosure of claim 1, wherein the end cap includes a conically shaped end.

7. The enclosure of claim 1, further comprising:
a filter for the second window configured to create a light.

8. The enclosure of claim 7, wherein the light is one or more colors.

9. The enclosure of claim 8, wherein the one or more colors includes red.

\* \* \* \* \*